(No Model.)
J. F. HANRAHAN.
REFRIGERATOR AND REFRIGERATOR BUILDING.
No. 307,459. Patented Nov. 4, 1884.
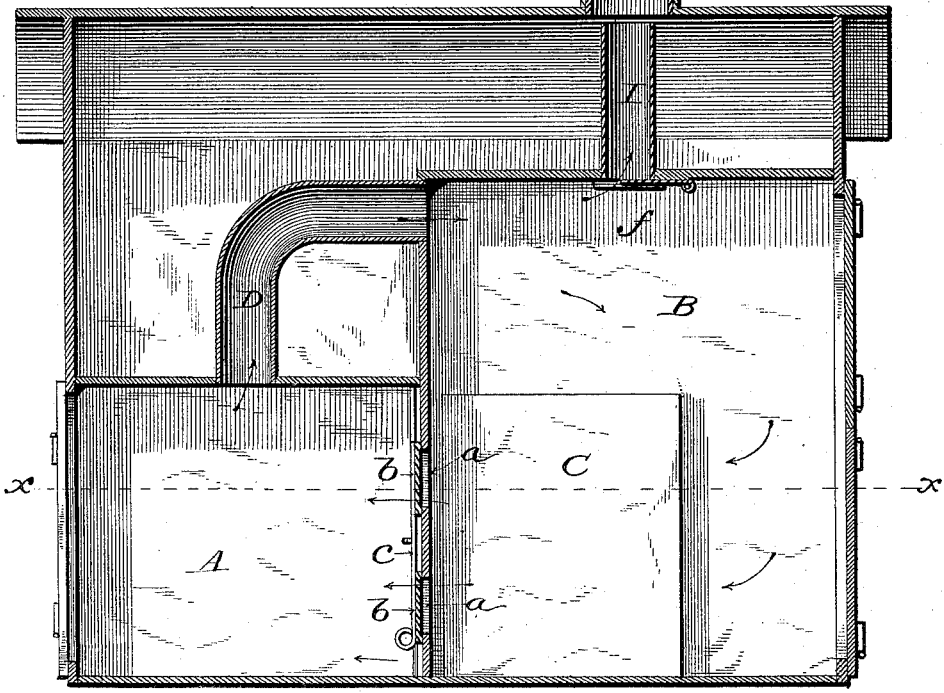
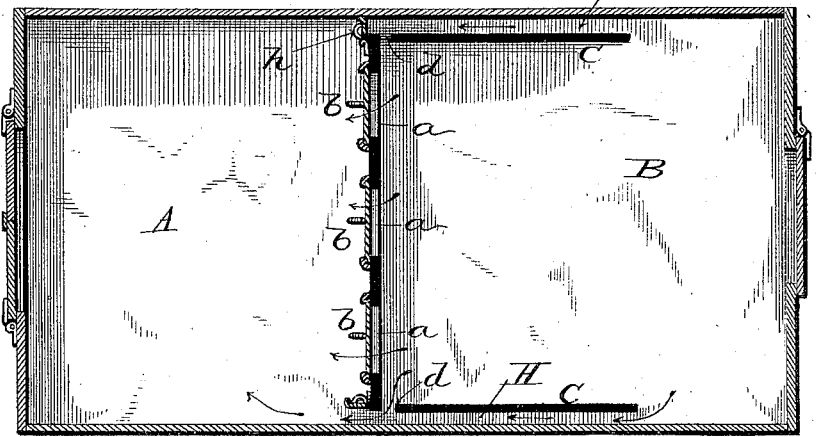
WITNESSES
F. L. Ourand
W. J. Dodge
INVENTOR,
JOSEPH F. HANRAHAN,
by Dodge & Son,
Attorneys.

UNITED STATES PATENT OFFICE.

JOSEPH F. HANRAHAN, OF OTTAWA, ONTARIO, CANADA, ASSIGNOR OF ONE-FOURTH TO JAMES GORDON, OF SAME PLACE.

REFRIGERATOR AND REFRIGERATOR-BUILDING.

SPECIFICATION forming part of Letters Patent No. 307,459, dated November 4, 1884.

Application filed July 17, 1884. (No model.)

*To all whom it may concern:*

Be it known that I, JOSEPH F. HANRAHAN, of Ottawa, in the county of Carleton and Dominion of Canada, have invented certain new and useful Improvements in Refrigerators and Refrigerator-Buildings, of which the following is a specification.

My invention relates to refrigerating buildings or compartments for the storage and preservation of the carcasses of slaughtered animals and similar purposes; and the invention consists in the combination of an ice-chamber and a storage-chamber with air-ducts and ventilating-pipes having gates or slides for closing or opening them at will, all as hereinafter more fully set forth.

Figure 1 is a central longitudinal vertical section of a building constructed on my plan, and Fig. 2 is a transverse horizontal section on the line *x x* of Fig. 1.

The object of this invention is to provide a refrigerating-room in which freshly-slaughtered animals can be hung and cooled, and the animal heat, with the vapors and smells arising therefrom, be conveyed away into the outer air, and the meat then retained in the compartment at the required temperature to preserve it and keep it in the best condition for any desired length of time. To accomplish these objects I construct a building, as represented in the drawings, in which B represents a room for the reception of ice stored in bulk, and A the room in which the carcasses are to be hung or otherwise stored.
From the top of the ice-room B one or more ventilating-tubes, I, extend out through the roof, and is provided with a slide, *f*, or similar means by which it can be closed or opened at will. From the top of the meat-room A tube D extends upward and terminates in the ice-room B near the ceiling, as shown in Fig. 1. In the partition-wall between the two rooms A and B, I make a series of openings, *a*, these openings being arranged in rows at different heights from the floor, and each being provided with a slide, *b*, by which they may be closed in whole or in part, as may be desired. For convenience, the slides of each vertical row are all connected by a rod, *c*, so that they may be all moved at one operation, though it is obvious they may be arranged to be operated separately, if desired. Along two sides of the ice-chamber B, I erect a partition, C, as shown in Figs. 1 and 2, between which and the outer wall, a space, H, is left for the passage of the air. These partitions are extended up as high as the ceiling of the meat-room B, or nearly so, as shown in Fig. 1, and they extend two-thirds (more or less) along each side wall, the space being left open at their inner ends of the full height. At the opposite end of the passages thus formed, at the point where they enter the room A, I hinge a narrow door *h*, by which the passages can be closed or opened, at will, one being shown open and the other closed in Fig. 2. At or near the point where these partition-walls C unite with the wall which separates the rooms A and B, I make a vertical opening, *d*, as shown in Fig. 2, to permit the cold air to enter at that point also. It will of course be understood that all the outer walls and the ceilings will be made hollow and filled with sawdust or tan-bark, or be rendered non-conducting by any of the usual methods, which, being well-known, need not be described, and also that suitable doors will be provided for each room.

The operation of the apparatus is as follows: The room B is first filled with ice to any desired height, but preferably as high as the ceiling of the meat-room or higher, the ice being packed in as snugly as convenient in blocks, without sawdust or any similar material. When the animals are slaughtered, they are dressed and then hung up in the room B. The doors *h* are then opened, and also the slide *f* in the ventilator I. The animal heat of the carcasses warms the air in room A, which then rises and passes out through the tube D into the upper part of chamber B, and from thence out through the ventilator, thereby carrying off the heat, and also the vapors and scents generated or given off from the carcasses, cold air from among and around the cakes of ice flowing from the ice-chamber through the side passages, H, into the chamber A to supply the place of that expelled from the chamber B through the tube D. If it be desired to hasten the operation, the holes $a$ in the partition-wall between the rooms may also be opened in whole or in part, and if a very rapid and thorough ventilation be required the upper door of the ice-room may be slightly opened to admit a still greater supply from the outer air; or a small opening in the outer wall, above the ice, may be provided for that purpose, it of course being provided with means for closing it at will. As soon as the meat has become cooled and the vapors therefrom have been expelled, the whole is closed up tight, or nearly so, and left in that condition, when the cold air will flow from the ice-room into chamber A, through the lower part of the side passages, and also through the openings $a$, if left open, and from thence back through the upper part of the same side passages, actual tests showing that there will be a current of air flowing inward toward the room A, near the floor, and outward near the ceiling. At the same time, if the ventilator I be opened more or less, a portion of the air which is most warmed, and therefore the lightest, will pass from the chamber A through the tube D into the upper part of the ice-room B, what little vapor and smell there may be escaping gradually through the ventilator I. In this way a constant circulation of the air is kept up, owing to the tendency of the air to equalize itself in temperature in the two rooms, and the temperature in the store-room A will thus be kept at about 40°, which is found to be better than a freezing-temperature, as experience has demonstrated that freezing fresh meat injures it. By means of the doors $h$ and the slides $b$ the temperature can be regulated to a nicety.

I have found by experience that a body of ice thus stored and used will in a short time become compacted by the cakes freezing fast to each other, so that in effect the pile becomes a single solid mass, and that thereafter it melts upon its outer surface only, thus leaving a narrow space all around between its sides and the walls which inclose it. The air as it is cooled drops down into these spaces, and flows from thence into chamber A, and from thence back again in contact with the mass of ice, and so on continuously. The air as it is cooled is also rendered dry by the condensation of whatever moisture it contains, and hence the meat in room A is kept in a cool dry atmosphere, which prevents it from acquiring that moist and slimy condition which meat has when stored in contact with ice, or has refrigerating-coils placed in the same room with it. The condensation of whatever vapor or moisture the air contains when it returns from the meat-room into the ice-room B also tends to extract and carry off from the meat the fleshy smell which all meat has when closely confined. It will of course be understood that a suitable pipe or drain will be arranged to carry off whatever water is produced by the gradual melting of the ice.

While this apparatus is specially designed for use in connection with slaughter-houses, it is obvious that it may be used for other purposes also, such as preserving fruits and all similar articles, cooling dwellings, and the like. In applying it on shipboard for transporting fresh meat the ice-chamber B may be arranged on one deck and the preserving-chamber A be located on a deck below, or even in the hold, it only being necessary in such cases to connect the side spaces, H, in the air-chamber, by suitable ducts, with the preserving-chamber below, and arrange the tube D so as to convey the warmer air back into the ice-chamber again, the principle and mode of operation being the same as above described.

I am aware that refrigerating-buildings have been described in which there was an ice-chamber and a storage-room connected by openings with slides for the passage of air to and fro, and that ventilating-flues have been arranged in various ways in connection with the same, and therefore I do not claim such devices, broadly; but,

Having thus fully described the construction and operation of my invention, what I claim is—

1. The combination, in a refrigerating-building, of the ice-chamber B, provided with the side partitions, C, extending two thirds of the distance along each side, (more or less,) with the storage-room A, provided with the ventilating pipe or flue D, extending from its ceiling upward, and terminating in the upper part of the ice-chamber B, with doors $h$, connecting the storage-room with the air-spaces behind the partitions C of the ice-chamber, all constructed and arranged to operate substantially as described.

2. The combination of a storage-room, A, and an ice-chamber, B, the two being connected with air-passages the full height of the storage-room, said passages being provided with doors $h$ for closing the same at will, substantially as shown and described.

3. The ice-chamber B, provided at its upper portion with a ventilating-tube, I, with means for closing the same, and having the air-passages at its opposite sides formed by the partitions C, in combination with the storage-room A, having the tube D extending from its upper portion into the ice-chamber B, all arranged to operate substantially as and for the purpose set forth.

JOSEPH F. HANRAHAN.

Witnesses:
WALTER S. DODGE,
CHAS. P. DRURY.

Correction in Letters Patent No. 307,459.

DEPARTMENT OF THE INTERIOR,
UNITED STATES PATENT OFFICE,
*Washington, D. C., December 2, 1884.*

In compliance with the request of the patentee, Letters Patent No. 307,459, granted November 4, 1884, upon the application of Joseph F. Hanrahan, of Ottawa, Ontario, Canada, for an improvement in "Refrigerators and Refrigerator Buildings," is hereby limited so as to expire at the same time with Canadian Letters Patent No. 20,334, dated October 6, 1884, issued to the same applicant.

It is hereby certified that the proper entries and corrections have been made in the files and records pertaining to the case in the Patent Office.

This amendment is made that the United States patent may conform to the provisions of Section 4,887 of the Revised Statutes.

BENJ. BUTTERWORTH,
*Commissioner of Patents.*

Approved:
M. L. JOSLYN,
*Acting Secretary of the Interior.*